United States Patent [19]

Ochsenbein et al.

[11] Patent Number: 4,472,544

[45] Date of Patent: Sep. 18, 1984

[54] ANTI-SHRINK ADDITIVE FOR UNSATURATED POLYESTER, ITS FABRICATION PROCESS, AND ANTI-SHRINK COMPOSITIONS

[75] Inventors: Michel Ochsenbein, Creil; Jean-Paul Ollivier, Paris, both of France

[73] Assignee: CDF-Chimie S.A., Paris, France

[21] Appl. No.: 515,641

[22] Filed: Jul. 21, 1983

[30] Foreign Application Priority Data

Jul. 27, 1982 [FR] France ................ 82 13099

[51] Int. Cl.³ .................. C07C 69/34; B01F 17/36; D06P 1/68
[52] U.S. Cl. .................. 523/511; 523/500; 528/301
[58] Field of Search ........... 523/511, 500; 528/301

[56] References Cited

U.S. PATENT DOCUMENTS

| 2,889,294 | 6/1959 | Layman | 528/301 |
| 3,432,458 | 3/1969 | Kwan et al. | 523/511 |
| 3,652,502 | 3/1972 | Jackson et al. | 528/301 |
| 3,714,292 | 1/1973 | Baum et al. | 523/511 |
| 3,925,300 | 12/1975 | Roberts et al. | 525/168 |
| 3,998,909 | 12/1976 | Roberts et al. | 523/500 |

FOREIGN PATENT DOCUMENTS

| 2172374 | 9/1973 | France. | |
| 48-12115 | 4/1973 | Japan | 528/301 |
| 51-23594 | 2/1976 | Japan | 528/301 |

Primary Examiner—Ronald W. Griffin
Attorney, Agent, or Firm—Sigalos & Levine

[57] ABSTRACT

An anti-shrink additive for unsaturated polyester resins of the formula:

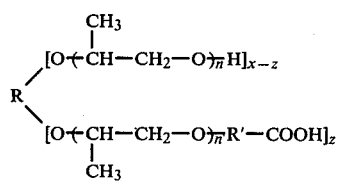

wherein,
R is the remainder of a triol or tetrol,
x is 3 or 4,
z is $\geq 1$,
R' is the remainder of the radical of the product carrying the acid function, and
n and n' being such that the molecular weight of the non-acidified propoxylated compound is preferably between 1,000 and 3,000.

The invention also comprises the method of making such additive and unsaturated polyester resins containing such additive.

7 Claims, No Drawings

ANTI-SHRINK ADDITIVE FOR UNSATURATED POLYESTER, ITS FABRICATION PROCESS, AND ANTI-SHRINK COMPOSITIONS

BACKGROUND OF THE INVENTION

The present invention concerns an anti-shrinkage additive for unsaturated polyester resins. The invention deals with a tri- or tetrafunctional polyether, condensation product of propylene oxide on a triol or tetrol, with this condensation product being acidified in such a manner that it possesses at least one terminal acidic functional group per elementary molecule.

The molding of objects based on unsaturated polyester resins is well known. It is also known that most conventional unsaturated polyester resins lead to volumetric shrinkage estimated at 8% to 10%, which causes numerous defects on the molded objects; such as shrinkage cracks, irregular dimensions, wrinkles, fissures, and poor surface appearance.

In order to alleviate these drawbacks, numerous additives have been proposed to be added to the unsaturated polyesters. For example, in French Pat. No. 1,530,817 or U.S. Pat. No. 3,925,300 thermoplastic polymers were added to certain types of unsaturated polyesters. Even though this addition makes it possible to obtain objects possessing a good surface appearance with very little shrinkage starting from a moist molding process, it is not effective in the case of mass moldings or leaf moldings. In German Pat. No. 2,354,716, it has been proposed to add to the polyester a vinyl ethylene acetate copolymer or vinyl ethylene propionate copolymer, but the results obtained are not very satisfactory industrially.

Not only are these techniques unsatisfactory, but they present the inconvenience of introducing considerable quantities of thermoplastic resins having formulations of generally elevated viscosity, requiring decreased fillers, which increases the price of the molded products.

SUMMARY OF THE INVENTION

The present invention overcomes the existing problems and provides an anti-shrinkage agent making it possible to compensate for the shrinkage of unsaturated polyester resins. It is also a low viscosity liquid making possible a considerable freedom in the use of fillers in the formulas for moldings, whatever they may be. An additional advantage of the anti-shrinking agent is to permit obtaining molded products possessing a good surface appearance and practically presenting no "wrinkled" appearance.

Briefly stated, the present invention comprises an anti-shrink additive for unsaturated polyester resins comprising a compound of the formula

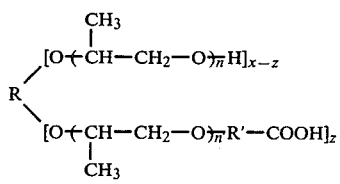

wherein

R is the remainder of the triol or tetrol starting compound;

x is the functionality of the primer, equal to 3 or 4;

z is the number of acidified, terminal hydroxyl functions, z being $\geq 1$;

R' is the remainder of the radical of the acid function carrying product; and n and n' being such that the molecular mass of the non-acidified propoxylated product, or even of the condensation product of propylene oxide on the triol or tetrol, is preferentially between 1,000 and 3,000, and even better between 1,400 and 2,400. It is understood that n and n' can be equal or different.

The invention also comprises unsaturated polyester resins containing such additives.

DETAILED DESCIPTION

One of the ways to prepare this additive consists of polyesterifying a polyol and then to acidify the polyether polyol.

The polyether polyols can be obtained by a classical process which consists of adding propylene oxide onto a triol or a tetrol. A polyether polyol of the following structure is obtained:

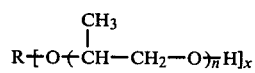

with R and x being such as previously defined.

The quantity of propylene oxide "n" condensed on the triol or tetrol is such that the molecular weight of the polyol obtained is preferably between 1,000 and 3,000.

The polyether polyol can be obtained by causing to react an alkaline compound such as sodium or potassium, or an alcoholic preparation of sodium or of potassium with lower alcohols such as methanol, ethanol, propanol, butanol, tertiobutanol, and the like onto the triol or tetrol. We then have propylene oxide to react on the alcoholic preparation at a temperature between 80° C. and 150° C. The polyether polyol is recovered after neutralization or by adsorption, for example, on magnesium silicate. By way of an example, the initial polyol can be trimethylolpropane, pentaerythritol, glycerol.

The polyether polyol having been obtained is acidified in such a way that at least one terminal function per molecule is carboxylic. Acidification takes place according to classical procedures of organic chemistry, making it possible to pass a hydroxyl group to an acidic functional group. By way of an example, we can cite the reaction of a cyclic anhydride, such as phthalic anhydride, succinic anhydride, or yet maleic anhydride, with a polyether polyol. This reaction can take place by mixing and maintaining at about 150° C., under refluxing, the polyol/anhydride mixture during the time sufficing for acidification.

The best performances of the additive are obtained for the compositions including:

(a) 20 to 50 parts by weight of an unsaturated polyester, (b) 5 to 30 parts by weight of the above additive, and (c) 20 to 65 parts of a monomer having ethylenic unsaturation.

The unsaturated polyester is a classical product of high utility. It is usually prepared by the condensation of a dicarboxylic acid having an unsaturated ethylene in positions $\alpha,\beta$, or an anhydride or mixtures of these latter, with a diol or mixtures of diols. Such polyesters have been widely described in the literature for instance in French Pat. No. 1,530,817 (cited previously). The unsaturated polyesters most preferred are those possessing a molecular weight factor by double carbon-carbon bond from 150 to 186. It is also necessary to incorporate a monomer having the unsaturated ethylene group into the unsaturated polyester compositions. This can be accomplished in the known conventional manner. Customarily this monomer possesses at least one group of $CH_2=C<$ polymerizable reactant. Most often this monomer is styrene.

The compositions, based on the additive according to the invention, can contain all of the other additives conventionally utilized with unsaturated polyesters. By way of example, there are the fibers or fabrics of glass, fillers, coloring agents, thermoplastic polymers, and others. The additions to formulations of a very slight quantity of thermoplastic polymer, generally below 2.5 parts by weight in regard to the three constituents of the preceding composition, make it possible to improve the homogeneity during flow of the composition.

The invention will be further described in connection with the following examples which are set forth for purposes of further illustration only, and not by way of limitation of the invention.

The linear shrinkage of the following examples is defined from the following formula:

Lo = length of the mold at 20° C.
lo = width of the mold at 20° C.
L = length of the molded plate measured after cooling at 20° C.
l = width of the molded plate measured after cooling at 20° C.
R = linear shrinkage.

$$R = [[(Lo+lo)-(L+l)]/(Lo+lo)] \times 100$$

The surface appearance and the shrinkage holes to the right of the shrinkage ridges can be appreciated visually.

The application tests concern molding products called "preimpregnated" or "sheet molding compound". The technique consists of mixing the unsaturated polyester resin, styrene, the "anti-shrinkage" additive with peroxides, inert fillers, and molding release agents. When this mixture has been formed a thickening agent, such as magnesia, is added in the known, usual manner. The final mixture is spread out on a polyethylene film, for example, by means of a spreader bar. On this mixture there are deposited glass fibers of about 25 to 50 mm of length. A second film of polyethylene is placed over the entire unit in such a way as to form a "sandwich". Magnesia causes the mixture to thicken. When the consistency is sufficient, we proceed with molding. Molding is carried out under pressure, with the mold being heated to about 150° C. The pressure on the material is about 70 Kg/cm². Prior to molding, the mixture is freed from polyethylene films. The pressure causes the material to flow in such a way as to fill the mold and the temperature causes the decomposition of the peroxide, thus assuring the copolymerization between styrene and the unsaturated polyester. The mold being utilized forms a plate.

EXAMPLE 1

Into an autoclave of 6 liter capacity, equipped with an agitator, with a temperature off-take and with a temperature regulation system, there is introduced 402 parts of tri-methylolpropane and 15.8 parts of 85% potassium hydroxide pellets. The mixture is heated under agitation at 110° C. under a vacuum of 1 to 5 mm of mercury for 1 hour in a manner so as to eliminate the water formed by alcoholysis and that contained in the potassium hydroxide. Then, by means of a pump, there is added 4,300 parts of propylene oxide in 6 hours at about 115°–150° C. After the introduction of the oxide, the reaction mixture is maintained at 120° C. for 2 hours.

The propylene oxide not having reacted at 110° C. under vacuum of 1 to 5 mm of mercury is distilled.

The product is then demineralized by 135 parts of magnesium silicate and 22.5 parts of filtration agent.

The polyether polyol is then filtered while hot, under pressure. The product thus obtained has the following characteristics:

| | | |
|---|---|---|
| hydroxyl value | = | 108 |
| functionality | = | 3 |
| molecular weight | = | 1550 |

1,550 grams of polyether polyol are introduced into a reactor with 222 g of phthalic anhydride. The mixture is agitated and heated under reflux at 140° C. for eight hours. The additive having thus been obtained possesses the following characteristics:

| | | |
|---|---|---|
| acid index (number) | = | 50 |
| molecular mass (weight) | = | 1700 |

It is then introduced into formulations A and B set forth below for preimpregnated molding as previously indicated.

The formulations adopted are the following ones in parts per weight:

| | A | B |
|---|---|---|
| Unsaturated polyester* | 42 | 42 |
| Styrene (vinylbenzene) | 41 | 41 |
| Additive | 11 | 11 |
| CaCO₃ filler (load) | 220 | 220 |
| Zinc stearate | 5 | 5 |
| Tertiary butyl perbenzoate | 1.5 | 1.5 |
| Magnesia | 1 | 1 |
| Vinyl polyacetate in solution at 40% in styrene | — | 5 |
| Glass fiber cut in length of about 25 mm | 25% in regard to total weight | |

*condensation product of maleic anhydride and propylene glycol.

After fabrication of the preimpregnated specimen and molding, the following results are obtained:

| | A | B |
|---|---|---|
| Linear shrinkage | 0.0140 | 0.0139 |
| Surface appearance | good, homogeneous appearance | bright, homogeneous, |
| Shrinkage holes (pipe holes, shrinkage cavities) | very slight, hardly apparent | very slight, hardly apparent |

EXAMPLE 2

We operate according to Example 1, but by replacing the trimethylolpropane with 276 g of glycerol with which 4,524 g of propylene oxide are reacted. The polyether polyol having thus been obtained is treated with 222 g of phthalic anhydride in order to obtain a product whose acid index is 47 and the molecular weight is 1,725.

This additive is introduced into the same formulation A as that of Example 1. The product is molded and the following results are obtained:

| | | |
|---|---|---|
| Linear shrinkage | = | −0.0157 |
| Surface appearance | = | bright, homogeneous, very good |
| Shrinkage holes (pipe holes, shrinkage cavities) | = | not apparent |

It must be noted that the negative number of the linear shrinkage indicates a swelling of the material with regard to the mold at ambient temperature of about 20° C.

EXAMPLE 3 COMPARATIVE EXAMPLE

One operates according to Example 1, but by diminishing the quantity of propylene oxide introduced to limit the molecular weight. After treatment with phthalic anhydride, the product obtained possesses the following characteristics:

| | | |
|---|---|---|
| acid index | = | 95 |
| molecular mass | = | 667 |

This product, introduced into the same formulation as in Example 1A, after molding gives the following results:

| | | |
|---|---|---|
| Linear shrinkage | = | 0.18 |
| Surface appearance | = | very poor |
| Shrinkage holes (pipe holes, shrinkage cavities) | = | very apparent |

EXAMPLE 4

We operate according to Example 1, but by replacing the tri-methylolpropane by 1,004 parts of pentaerythritol, having previously been propoxylated, of a molecular weight of 334, onto which 3,682 parts of propylene oxide are added.

1,540 g of the product obtained, having a molecular mass (weight) of 1,540 and a functionality of 4, are treated with 148 g of phthalic anhydride in order to yield a compound of a molecular mass of 1,625 and of an acid index equal to 31.3. In the same manner as previously, we achieve the formulation for a preimpregnated specimen of Example 1A and after molding one obtains the following results:

| | | |
|---|---|---|
| Linear shrinkage | = | −0,0200 |
| Surface appearance | = | very good |
| Shrinkage holes (pipe holes, shrinkage cavities) | = | not apparent |

EXAMPLE 5 COMPARATIVE EXAMPLE

The following formulation has been achieved:

| | |
|---|---|
| Unsaturated polyester weight according to Example 1 | 42 |
| Vinyl polyacetate in solution at 40% in styrene | 5 |
| Styrene | 53 |
| CaCO3 filler | 220 |
| Zinc stearate | 5 |
| Tertiary butyl perbenzoate | 1.5 |
| Magnesia | 1 |
| Glass fiber cut in lengths of about 25 mm | 25% in relation to the total weight |

After molding one obtains a product possessing the following characteristics:

| | | |
|---|---|---|
| Linear shrinkage | = | 0,260 |
| Surface appearance | = | very poor |
| Shrinkage holes (pipe holes, shrinkage cavities) | = | very apparent, presence of small cracks |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. An anti-shrinkage additive for unsaturated polyester resins consisting essentially of the acidified condensation product formed by reacting propylene oxide with a triol or tetrol to form a condensate and acidifying said condensation product to substitute at least one terminal hydroxyl functional group thereof by at least one terminal acidific functional group per elementary molecule and having the general formula:

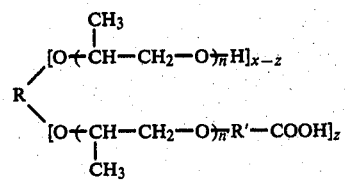

wherein, R is the remainder of the triol or tetrol; x is 3 or 4; $z \geqq 1$; R' is the radical of the acidic compound containing the acidic functional group; and n and n' being such that the molecular weight of the non-acidified propoxylated compound is between about 1,000 and 3,000.

2. The additive of claim 1, wherein R' is the radical of a cyclic anhydride.

3. The process for making the additive of claim 1 comprising condensing a propylene oxide with a triol or a tetrol to obtain a polyether polyol, and acidifying said condensate to substitute at least one terminal hydroxyl functional group thereof by an acid functional group.

4. The process of claim 3, wherein the quantity of propylene oxide condensed with a triol or a tetrol is regulated so as to obtain a polyether polyol of a molecular weight between 1,000 and 3,000.

5. The process of claims 3 or 4, wherein a cyclic anhydride is reacted with the polyether polyol in such a quantity that at least one terminal hydroxyl functional group is substituted by an acidic functional group.

6. An unsaturated polyester resin composition polyester containing a monomer with ethylenic unsaturation comprising for each 100 parts by weight:
   (a) 20 to 50 parts by weight of an unsaturated polyester resin,
   (b) 5 to 30 parts by weight of additive of claim 1, and
   (c) 20 to 65 parts by weight of a monomer with ethylenic unsaturation.

7. The composition of claim 6 also containing a thermoplastic polymer in an amount less than 2.5 parts by weight.

* * * * *

UNITED STATES PATENT AND TRADEMARK OFFICE
CERTIFICATE OF CORRECTION

PATENT NO. : 4,472,544
DATED : September 18, 1984
INVENTOR(S) : Michel Ochsenbien and Jean-Paul Ollivier It is certified that error appears in the above-identified patent and that said Letters Patent are hereby corrected as shown below:

In the formula that appears in the Abstract, column 1, and Claim 1, "$O \text{---} )_n \text{---} R'$" should be --$O \text{---} )_{n'} \text{---} R'$--.

Signed and Sealed this

Nineteenth Day of February 1985

[SEAL]

Attest:

DONALD J. QUIGG

Attesting Officer　　Acting Commissioner of Patents and Trademarks